United States Patent
Shi et al.

(10) Patent No.: US 9,197,853 B2
(45) Date of Patent: Nov. 24, 2015

(54) SWITCHING BETWEEN VIEWS USING NATURAL GESTURES

(71) Applicants: Shu Shi, Menlo Park, CA (US); John Barrus, Menlo Park, CA (US)

(72) Inventors: Shu Shi, Menlo Park, CA (US); John Barrus, Menlo Park, CA (US)

(73) Assignee: Ricoh Company, Ltd, Tokyo (JP)

( * ) Notice: Subject to any disclaimer, the term of this patent is extended or adjusted under 35 U.S.C. 154(b) by 136 days.

(21) Appl. No.: 14/019,915

(22) Filed: Sep. 6, 2013

(65) Prior Publication Data

US 2014/0340465 A1   Nov. 20, 2014

Related U.S. Application Data

(60) Provisional application No. 61/825,482, filed on May 20, 2013.

(51) Int. Cl.
| | |
|---|---|
| *H04N 7/14* | (2006.01) |
| *H04N 7/15* | (2006.01) |
| *G06F 3/00* | (2006.01) |
| *H04N 21/414* | (2011.01) |
| *H04N 21/4788* | (2011.01) |

(52) U.S. Cl.
CPC .. *H04N 7/15* (2013.01); *G06F 3/00* (2013.01); *H04N 21/41407* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 5,999,208 A | 12/1999 | McNerney et al. | |
| 6,970,181 B1 | 11/2005 | Fadel | |
| 7,590,941 B2 | 9/2009 | Wee et al. | |
| 7,616,840 B2 | 11/2009 | Erol et al. | |
| 8,223,186 B2 | 7/2012 | Derocher et al. | |
| 8,330,793 B2 | 12/2012 | Robinson et al. | |
| 2009/0046075 A1* | 2/2009 | Kim et al. | 345/173 |
| 2010/0077431 A1 | 3/2010 | Neufeld et al. | |
| 2011/0249073 A1* | 10/2011 | Cranfill et al. | 348/14.02 |
| 2012/0229591 A1* | 9/2012 | Lee | 348/14.08 |
| 2013/0083151 A1* | 4/2013 | Kim et al. | 348/14.07 |
| 2013/0147906 A1* | 6/2013 | Weiser et al. | 348/14.09 |
| 2014/0215356 A1* | 7/2014 | Brander et al. | 715/753 |

OTHER PUBLICATIONS

Cisco, WebEx Meetings "Better Meetings from beginning to end", http://www.webex.com/products/web-conferencing.html, Jul. 19, 2013, 3 pages.

(Continued)

*Primary Examiner* — Maria El-Zoobi
(74) *Attorney, Agent, or Firm* — Patent Law Works LLP

(57) ABSTRACT

The disclosure includes a system and method for switching between video views and data views. The system includes a controller, a view presentation module, a screen detection module and a view switching module. The controller receives data indicating a participant joined a multi-user communication session. The view presentation module presents a video stream on a mobile device associated with the participant. The screen detection module determines an occurrence of a detection trigger event. The controller receives a video frame image responsive to the occurrence of the detection trigger event. The screen detection module detects a data screen in the video frame image. The view switching module switches a view on the mobile device from video view to data view responsive to a natural gesture performed by the participant. The view presentation module presents a data stream associated with the data screen on the mobile device.

20 Claims, 13 Drawing Sheets

(56) References Cited

OTHER PUBLICATIONS

Vidyo Mobile, "VidyoMobile Supported Devices," http://www.vidyo.com/products/vidyomobile/, Jul. 19, 2013, 2 pages.

Class X, Stanford University, "ClassX Interactive Streaming," http://classx.stanford.edu/ClassX/stanford_front_pages/mobile/, dated 2011, 1 page.

Google Maps, https://maps.google.com, Jul. 19, 2013, 1 page.

Ambulant, Open SMIL Player, News Demo, http://www.ambulantplayer.org/Demo-News-PlugIn.shtml, dated Jun. 1, 2010, 1 page.

Bajura, et al., Merging Virtual Objects with the Real World—Seeing Ultrasound Imagery within the Patient, dated Jul. 2, 1992, 8 pages, Department of Computer Science, University of North Carolina.

Prince et al., 3D Live: Real Time Captured Content for Mixed Reality, dated 2002, 8 pages, IEEE—Computer Society.

Hess, An Open-Source SIFT Library, dated Oct. 25-29, 2010, 4 pages, ACM, Firenza Italy.

Cockburn, Andy, Amy Karlson, and Benjamin B. Bederson. "A review of overview+ detail, zooming, and focus+ context interfaces." ACM Computing Surveys (CSUR) 41.1 (2008): 2.

* cited by examiner

SWITCHING BETWEEN VIEWS USING NATURAL GESTURES

CROSS REFERENCE TO RELATED APPLICATIONS

This application claims priority under 35 USC §119(e) to U.S. Application No. 61/825,482, entitled "Method of Switching between Views in Mobile Videoconferencing Using Gestures" filed May 20, 2013, the entirety of which is herein incorporated by reference.

BACKGROUND OF THE INVENTION

1. Field of the Invention

The specification relates to a system and method for switching between video views and data views. In particular, the specification relates to a system and method for switching between video views and data views using natural gestures in mobile videoconferencing.

2. Description of the Background Art

Existing videoconferencing systems collect and transmit data streams along with video and audio streams in a videoconference session. This is because in most business meetings, the users expect to not only see each other, but also to exchange data information, such as documents, presentation slides, handwritten comments, etc. These data streams are usually directly captured from computer screens, separately encoded with special coding tools, and displayed side-by-side with the video streams on a remote site.

The explosion of mobile devices drives more and more videoconferencing service providers to develop mobile applications such as smart phone and tablet applications. These mobile applications make it much easier for the users to access the videoconferencing service from anywhere using mobile devices.

However, it becomes a problem to display both a video view and a data view on the mobile device simultaneously. Due to the limited screen size of the mobile device, it is not possible to display both the video view and the data view at full resolution side-by-side. Currently, the commonly used method is to use a user interface that displays one view at the full screen scale while showing only the thumbnail for the other view. The user interface combines and displays the video view and the data view together. Such a user interface fails to provide a unified experience by separating the user interface into multiple view modes, and may cause confusion when there is more than one data stream.

SUMMARY OF THE INVENTION

The disclosure includes a system and method for switching between video views and data views on a mobile device. In one embodiment, the system includes a controller, a view presentation module, a screen detection module and a view switching module. The controller receives data indicating a participant joins a multi-user communication session. The view presentation module presents a video stream of the multi-user communication session on a mobile device associated with the participant. The screen detection module determines an occurrence of a detection trigger event. The controller receives a video frame image from the video stream responsive to the occurrence of the detection trigger event. The screen detection module detects a first data screen in the video frame image. The controller receives data describing a first natural gesture performed on the mobile device. The view switching module switches a view on the mobile device from video view to data view responsive to the first natural gesture. The view presentation module presents a first data stream associated with the first data screen on the mobile device.

In another embodiment, a computer-implemented method with the following steps is performed. The method receives data indicating that a first participant, a second participant and a third participant joined a multi-user communication session. The method presents a video stream of a multi-user communication session to a mobile device associated with the third participant. The method receives a video frame image from the first video stream that includes a first device associated with the first participant and a second device associated with the second participant. The method detects a first data screen from the first device and a second data screen from the second device in the video frame image. The method receives data describing a selection of the first data screen performed on the mobile device. The method switches a view on the mobile device from video view to a first data view that corresponds to the first data screen responsive to the selection. The method presents the first data stream on the mobile device.

Other aspects include corresponding methods, systems, apparatuses, and computer program products for these and other innovative aspects.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1A:
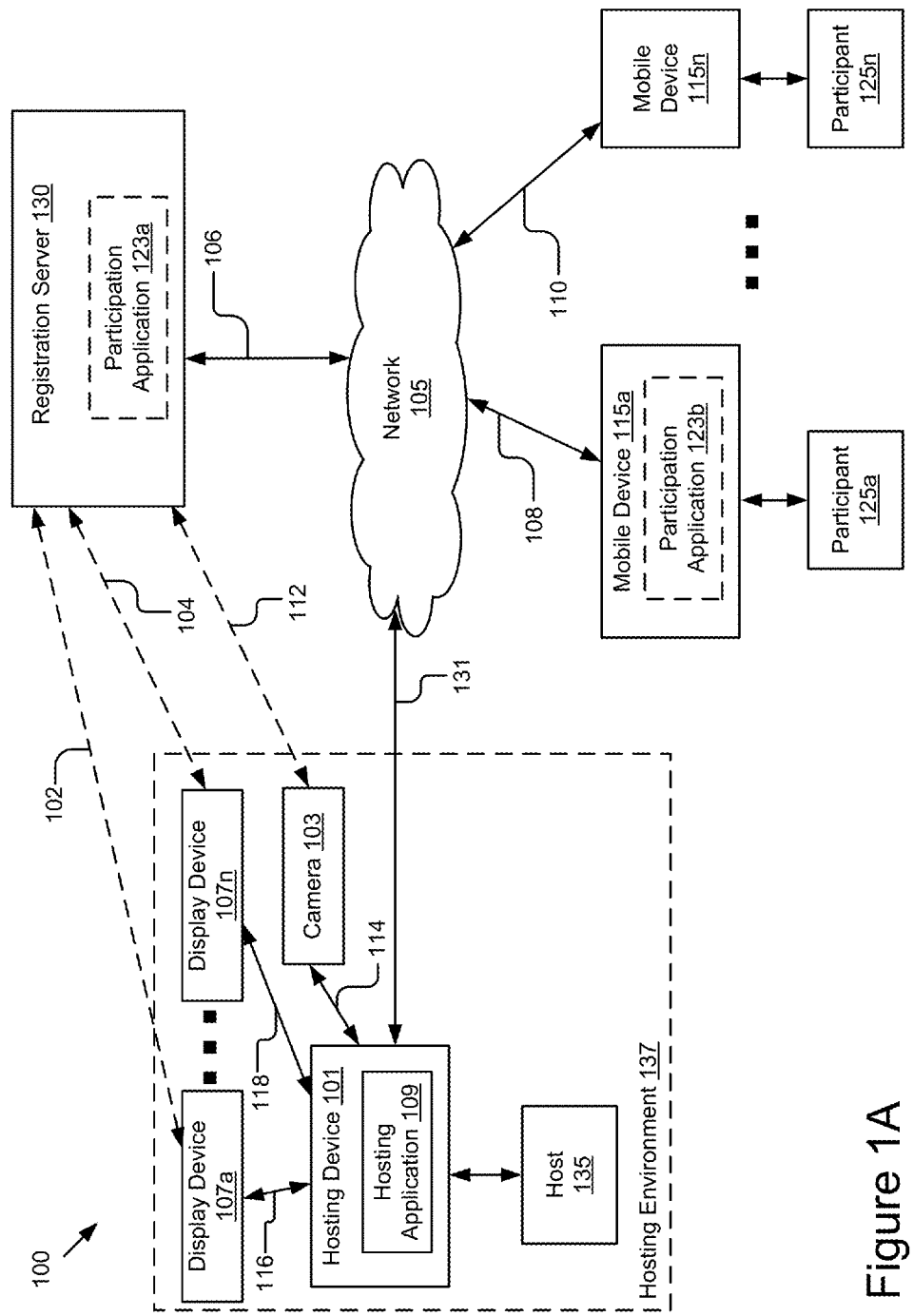
FIG. 1A is a high-level block diagram illustrating one embodiment of a system for switching between video views and data views.

The system described in the disclosure is particularly advantageous in numerous respects. First, the system allows a participant to use natural gestures such as pinch gestures to switch between video views and data views, and is capable of providing consistent and seamless user experience in multi-user communication sessions including mobile videoconferencing sessions.

Second, the system is capable of automatically detecting data screens in video frame images. A participant sees a data screen in a video view before switching to a data view showing the data screen in full resolution, which allows the participant to understand the relationship between a data stream of the data screen and the video content in the video view and therefore avoids confusion when more than one data stream is present. For example, if a speaker in a conference room moves frequently between two or more data screens such as a projector screen and a whiteboard screen, the system can eliminate a remote viewer's confusion between the projector screen and the whiteboard screen when the remote viewer frequently switches between the video view and the projection screen data view or between the video view and the whiteboard screen data view.

Third, the system supports embedded data streams and is capable of providing embedded data streams to users. For example, the system can present a data stream of a current meeting in a data view mode, where the data stream of the current meeting is a video clip describing a meeting. The video clip is embedded with slides and whiteboard stoke information presented in the previous meeting. The system can switch from the data view mode to the embedded data view mode to present the embedded slides and whiteboard stroke information to participants of the current meeting in full resolution. The system may have other numerous advantages.

A system and method for switching between video views and data views is described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to mobile devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1A illustrates a block diagram of a system 100 for switching between video views and data views according to one embodiment. The illustrated system 100 includes a hosting device 101 accessible by a host 135, a registration server 130, a camera 103, display devices 107a ... 107n and mobile devices 115a ... 115n accessible by participants 125a ... 125n. In FIG. 1A and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1A illustrates one network 105 coupled to the mobile devices 115, the hosting device 101 and the registration server 130, in practice one or more networks 105 can be connected to these entities.

A hosting environment 137 can be an environment to host a multi-user communication session. An example multi-user communication session includes a videoconferencing meeting. In some examples, a hosting environment 137 is a room where all the devices within the dashed box in FIG. 1A are visible to users. For example, the hosting environment 137 could be a conference room environment including one or more display devices 107 and one or more cameras 103 present in the conference room. Example display devices 107 include, but are not limited to, a projector, an electronic whiteboard, a liquid-crystal display and any other conventional display devices. In one embodiment, the camera 103 is an advanced videoconferencing camera. Example cameras 103 include, but are not limited to, a high-definition (HD) video camera that captures high-resolution videos, a pan-tilt-zoom (PTZ) camera that can be mechanically controlled or a group of cameras that provide multi-view or panoramic views in the hosting environment 137. Although two display devices 107 and one camera 103 are illustrated in FIG. 1A, the hosting environment 137 can include one or more display devices 107 and one or more cameras 103.

The hosting device 101, the display devices 107a ... 107n and the camera 103 are located within the hosting environment 137. The hosting device 101 is communicatively coupled to the display device 107a via signal line 116, the display device 107n via signal line 118 and the camera 103 via signal line 114. The display device 107a is optionally coupled to the registration server 130 via signal line 102; the display device 107n is optionally coupled to the registration server 130 via signal line 104; and the camera 103 is optionally coupled to the registration server 130 via signal line 112.

The hosting device 101 can be a computing device that includes a processor and a memory, and is coupled to the network 105 via signal line 131. For example, the hosting device 101 is a hardware server. In another example, the hosting device 101 is a laptop computer or a desktop computer. The hosting device 101 is accessed by a host 135, for example, a user that manages a meeting. The hosting device 101 includes a hosting application 109 and a storage device for storing the presentations generated by the hosting application 109.

The hosting application 109 includes software for hosting a multi-user communication session. For example, the hosting application 109 hosts a video conferencing meeting that the host 135 manages and one or more participants 125 join using one or more mobile devices 115. In another example, the hosting application 109 generates slides for giving a presentation.

In one embodiment, the hosting application 109 displays data to be shared with other participants 125 on one or more data screens of one or more display devices 107 in the hosting environment 137. Data to be shared with participants 125 includes, but is not limited to, a text-based document, web page content, presentation slides, video clips, stroke-based handwritten comments and/or other user annotations, etc. The one or more data screens in the hosting environment 137 are visible to the camera 103. For example, the presentation slides to be shared with other remote participants 125 are projected on the wall, where the projection of the presentation slides (or, at least a predetermined portion of the projection) is within a field of view of the camera 103. In this case, the camera 103 is capable of capturing the projection of the presentation slides in one or more video frame images of a video stream.

In another example, if a user in a conference room writes comments on an electronic whiteboard, the hosting application 109 can control movement of the camera 103 so that the electronic whiteboard is visible to the camera 103. In this case, the camera 103 is capable of capturing the comments shown in the electronic whiteboard in one or more video frame images of a video stream. The camera 103 captures a video stream including video frame images depicting the hosting environment 137, where the video frame images contain data screens of the display devices 107 and/or the data screen of the hosting device 101.

In one embodiment, the camera 103 sends the video stream to the hosting device 101, causing the hosting device 101 to forward the video stream to one or more of the registration server 130 and the mobile device 115. In another embodiment, the camera 103 sends the video stream directly to the registration server 130 and/or the mobile device 115 via the network 105. In yet another embodiment, the camera 103 sends a latest video frame image captured by the camera 103 to the registration server 130 responsive to an occurrence of a detection trigger event. The detection trigger event is described below in more detail with reference to FIG. 2.

In one embodiment, the hosting application 109 or the display device 107 captures a high quality version of a data stream displayed on a data screen of the display device 107. This high quality version of the data stream displayed on the data screen is referred to as a data stream associated with the data screen, which includes a series of data screen images (e.g., screenshot images) depicting content displayed on the data screen of the display device 107 over time. A screenshot image of a data screen depicts content displayed on the data screen at a particular moment of time. At different moments of time, different screenshot images of the data screen are captured, which form a data stream associated with the data screen. In some examples, a screenshot image of the data screen may be also referred to as a data frame of the data stream.

In some examples, the hosting application 109 captures a series of screenshot images describing a slide presentation in high resolution directly from a presentation computing device. In some additional examples, an electronic whiteboard captures original stroke information displayed on the whiteboard screen, and sends screenshot images depicting the original stroke information to the hosting application 109.

In one embodiment, the hosting application 109 sends the data stream associated with the data screen to one or more of the mobile device 115 and the registration server 130. In another embodiment, the display device 107 directly sends the data stream including one or more data screen images to one or more of the mobile device 115 and the registration server 130. For example, the display device 107 periodically sends an up-to-date data screen image to the registration server 130.

In one embodiment, the participation application 123a can be operable on the registration server 130. The registration server 130 includes a processor and a memory, and is coupled to the network 105 via signal line 106. The registration server 130 includes a database for storing registered images. The registration server 130 registers the display device 107 and receives a video feed for a meeting from the camera 103. The video feed includes one or more video frame images. The registration server 130 runs image matching algorithms to find a correspondence between a latest video frame and a latest screenshot image of a data screen associated with the display device 107 or the hosting device 101. If a match is found, the matching area is highlighted in the video frame image and displayed on the mobile device 115. The registration server 130 is described below in more detail with reference to FIGS. 2 and 3A.

In another embodiment, the participation application 123b may be stored on a mobile device 115a, which is connected to the network 105 via signal line 108. The mobile device 115a, 115n is a computing device with limited display space that includes a memory and a processor, for example a laptop computer, a tablet computer, a mobile telephone, a smartphone, a personal digital assistant (PDA), a mobile email device or other electronic device capable of accessing a network 105. The mobile device 115 includes a touch screen for displaying data and receiving natural gestures from a participant 125. Examples of natural gestures include, but are not limited to, tap, double tap, long press, scroll, pan, flick, two finger tap, pinch open, pinch close, etc.

In the illustrated embodiment, the participant 125a interacts with the mobile device 115a. The mobile device 115n is communicatively coupled to the network 105 via signal line 110. The participant 125n interacts with the mobile device 115n. The participant 125 can be a remote user participating in a multi-user communication session such as a videoconferencing session hosted by the hosting device 101. The mobile devices 115a, 115n in FIG. 1A are used by way of example. While FIG. 1A illustrates two mobile devices 115a and 115n, the disclosure applies to a system architecture having one or more mobile devices 115.

In one embodiment, the participation application 123 is distributed such that it may be stored in part on the mobile device 115a, 115n and in part on the registration server 130. For example, the participation application 123b on the mobile device 115 acts as a thin-client application that displays the video stream or the data stream while the registration server 130 performs the screen detection steps. The participation application 123b on the mobile device 115a instructs the display to present the video stream or the data stream, for example, by rendering images in a browser. The participation application 123b receives user input (e.g., natural gestures) from the participant 125 and interprets the user input. For example, assume the participation application 123b currently displays the video stream. The participation application 123b receives user input from the participant 125a to magnify the screen so much that it overcomes a threshold and the participation application 123b determines that the stream should be switched to the data stream of the hosting device 101. The participation application 123b sends instructions indicating to switch from the video stream to the data stream to the participation application 123a on the registration server 130.

The participation application 123 can be code and routines for participating in a multi-user communication session. In one embodiment, the participation application 123 can be implemented using hardware including a field-programmable gate array (FPGA) or an application-specific integrated circuit (ASIC). In another embodiment, the participation application 123 can be implemented using a combination of hardware and software. In various embodiments, the participation application 123 may be stored in a combination of the devices and servers, or in one of the devices or servers.

Figure 1B:
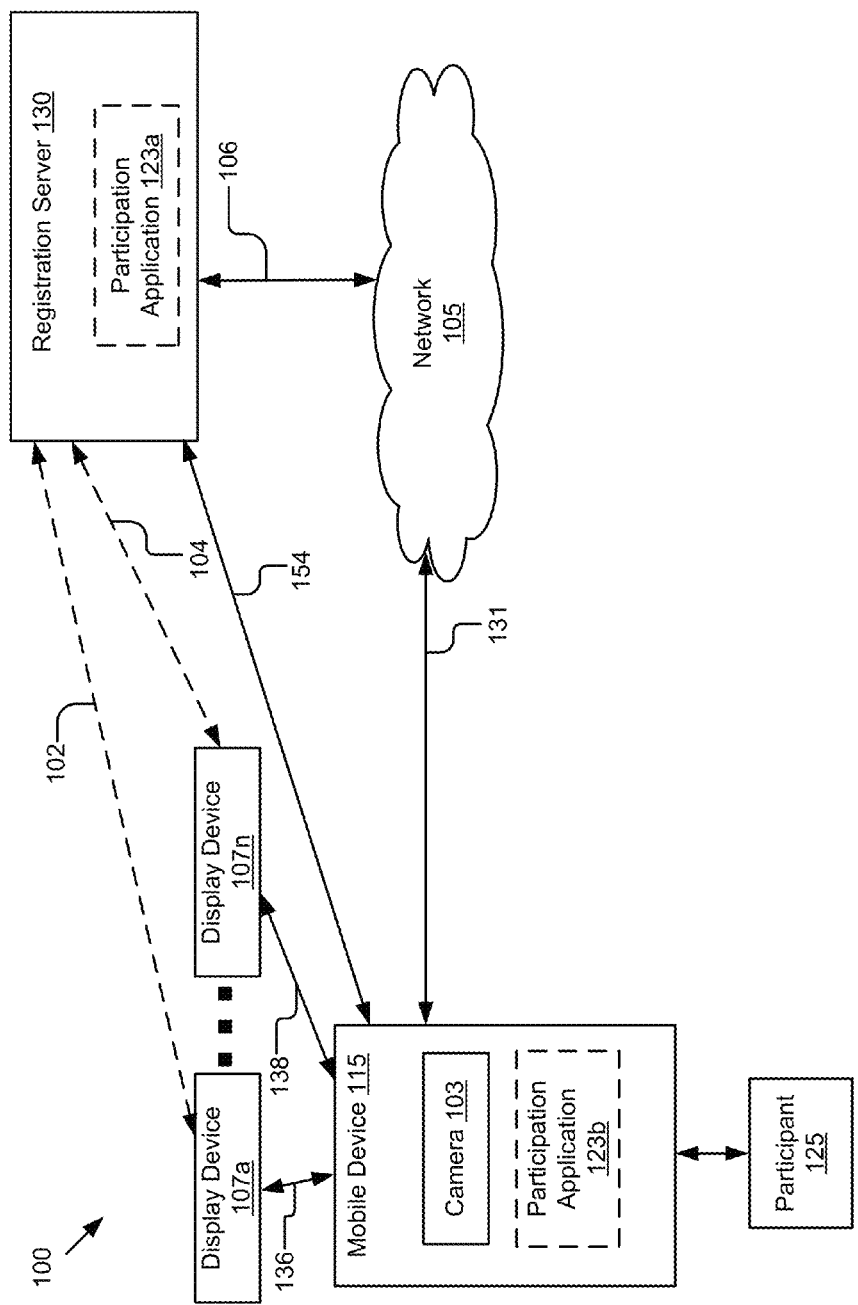
FIG. 1B is a high-level block diagram illustrating another embodiment of a system for switching between video views and data views.

FIG. 1B is another embodiment of a system for switching between video views and data views. In this embodiment, there is no hosting device 101. Instead, mobile devices 115 can comprise the camera 103 and the participation application 123b. The mobile devices 115 are coupled to the display devices 107a, 107n via signal lines 136, 138, respectively.

The participant 125 can activate the camera 103 on the mobile device 115 and point it at the display devices 107a, 107n to capture their content. The mobile device 115 can transmit the images directly to the registration server 130 via signal line 154. For example, the images can serve as a query from the mobile device 115. The participation application 123 uses the captured images to detect the screen from the video view and switches to the data view in response to receiving gestures from the participant 125.

Example Participation Application

Figure 2:
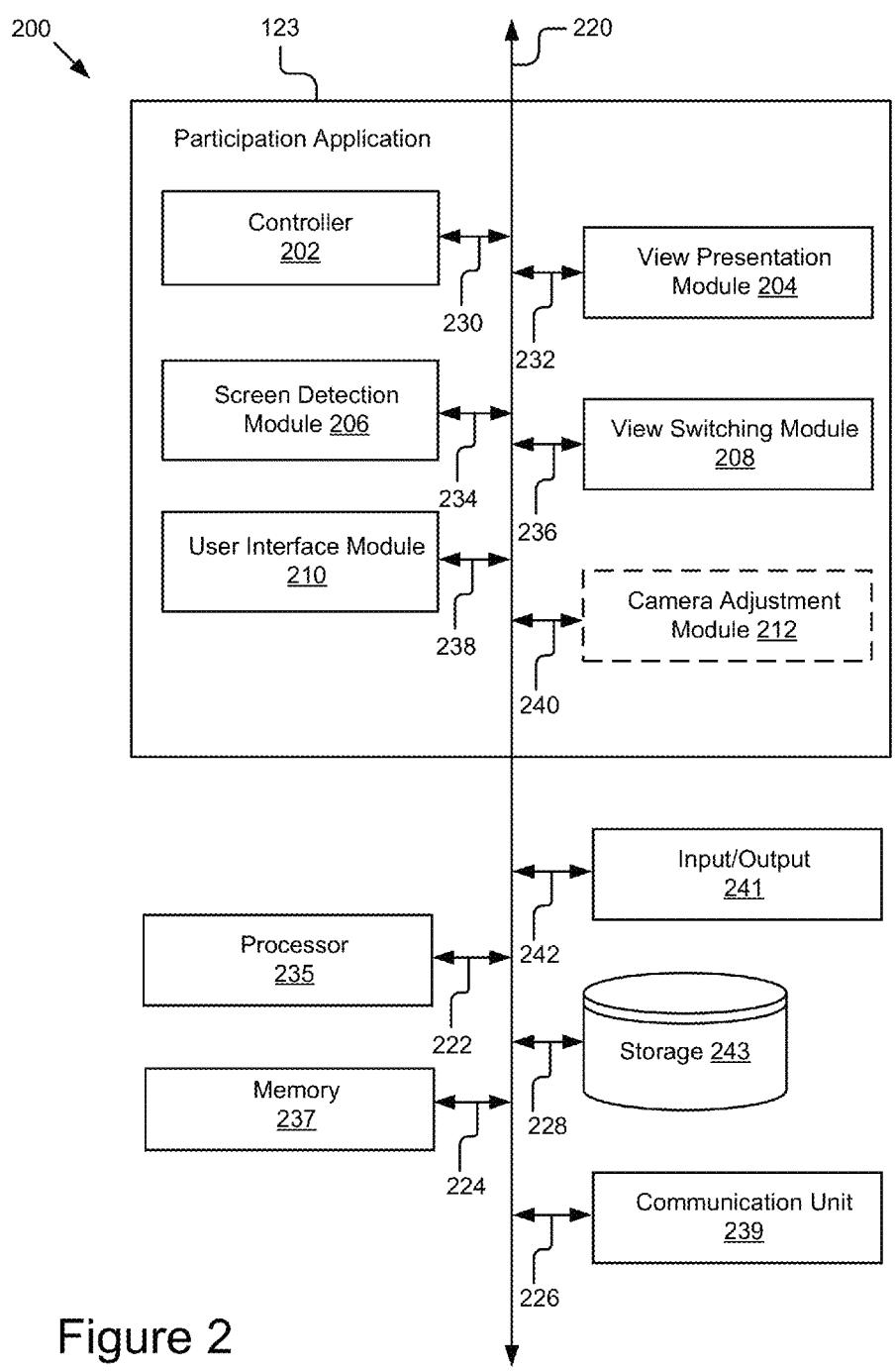
FIG. 2 is a block diagram illustrating one embodiment of a participation application.

Referring now to FIG. 2, an example of the participation application 123 is shown in more detail. FIG. 2 is a block diagram of a computing device 200 that includes a participation application 123, a processor 235, a memory 237, an input/output device 241, a communication unit 239 and a storage device 243 according to some examples. The components of the computing device 200 are communicatively coupled by a bus 220. The input/output device 241 is communicatively coupled to the bus 200 via signal line 242. In some embodiments, the computing device 200 can be one of a mobile device 115 and a registration server 130. For example, in one embodiment, the registration server 130 can include a participation application 123 with some of the components described below and the mobile device 115 can include some of the other components described below.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that can be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 239 transmits and receives data to and from at least one of the hosting device 101, the mobile device 115 and the registration server 130 depending upon where the participation application 123 is stored. The communication unit 239 is coupled to the bus 220 via signal line 226. In some embodiments, the communication unit 239 includes a port for direct physical connection to the network 105 or to another communication channel. For example, the communication unit 239 includes a USB, SD, CAT-5 or similar port for wired communication with the mobile device 115. In some embodiments, the communication unit 239 includes a wireless transceiver for exchanging data with the mobile device 115 or other communication channels using one or more wireless communication methods, including IEEE 802.11, IEEE 802.16, BLUETOOTH® or another suitable wireless communication method.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 239 includes a wired port and a wireless transceiver. The communication unit 239 also provides other conventional connections to the network 105 for distribution of files and/or media objects using standard network protocols including TCP/IP, HTTP, HTTPS and SMTP, etc.

The storage device 243 can be a non-transitory memory that stores data for providing the functionality described herein. The storage device 243 may be a dynamic random access memory (DRAM) device, a static random access memory (SRAM) device, flash memory or some other memory devices. In some embodiments, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the storage device 243 is communicatively coupled to the bus 220 via signal line 228. In one embodiment, the storage device 243 stores one or more of a video stream including one or more video frame images, a data stream including one or more data screen images and one or more detection trigger events, etc. The storage device 243 may store other data for providing the functionality described herein. For example, the storage device 243 could store copies of video conferencing materials, such as presentations, documents, audio clips, video clips, etc.

In the illustrated embodiment shown in FIG. 2, the participation application 123 includes a controller 202, a view presentation module 204, a screen detection module 206, a view switching module 208, a user interface module 210 and an optional camera adjustment module 212. The components of the participation application 123 are communicatively coupled via the bus 220. Persons of ordinary skill in the art will recognize that the components can be stored in part on the mobile device 115 and in part on the registration server 130. For example, the participation application 123 stored on the registration server 130 could include the screen detection module 206 and the participation application 123 stored on the mobile device could include the remaining components.

The controller 202 can be software including routines for handling communications between the participation application 123 and other components of the computing device 200. In one embodiment, the controller 202 can be a set of instructions executable by the processor 235 to provide the functionality described below for handling communications between the participation application 123 and other components of the computing device 200. In another embodiment, the controller 202 can be stored in the memory 237 of the computing device 200 and can be accessible and executable by the processor 235. In either embodiment, the controller 202 can be adapted for cooperation and communication with the processor 235 and other components of the computing device 200 via signal line 230.

In one embodiment, the controller 202 sends and receives data, via the communication unit 239, to and from one or more of the mobile device 115, the hosting device 101 and the registration server 130. For example, the controller 202 receives, via the communication unit 239, user input from a participant 125 operating on a mobile device 115 and sends the user input to the view switching module 208. In another example, the controller 202 receives graphical data for providing a user interface to a participant 125 from the user interface module 210 and sends the graphical data to a mobile device 115, causing the mobile device 115 to present the user interface to the participant 125.

In one embodiment, the controller 202 receives data from other components of the participation application 123 and stores the data in the storage device 243. For example, the controller 202 receives data describing one or more detection trigger events from the screen detection module 206 and stores the data in the storage device 243. In another embodiment, the controller 202 retrieves data from the storage device 243 and sends the data to other components of the participation application 123. For example, the controller 202 retrieves a data stream from the storage device 243 and sends the data stream to the view presentation module 204 for presenting the data stream to a participant 125.

The view presentation module 204 can be software including routines for presenting a video view or a data view on a mobile device 115. In one embodiment, the view presentation module 204 can be a set of instructions executable by the processor 235 to provide the functionality described below for presenting a data view or a video view on a mobile device 115. In another embodiment, the view presentation module 204 can be stored in the memory 237 of the computing device 200 and can be accessible and executable by the processor 235. In either embodiment, the view presentation module 204 can be adapted for cooperation and communication with the processor 235 and other components of the computing device 200 via signal line 232.

A video view mode presents video data associated with a multi-user communication session to a participant 125. For example, the video view mode presents the video stream of the other participants in the multi-user communication session to the participant 125 in full screen on the mobile device 115. In another example, the video view mode presents the video stream on the mobile device 115 in full resolution.

In one embodiment, the view presentation module 204 receives data indicating that a participant 125 joins a multi-user communication session from a mobile device 115 associated with the participant 125. Correspondingly, the mobile device 115 is in the video view mode. The view presentation module 204 receives a video stream including one or more video frame images from the camera 103 directly or via the hosting device 101, and presents the video stream to the participant 125 on a display of the mobile device 115.

In some examples, one or more data screens that are in the same hosting environment 137 as the camera 103 are captured in the one or more video frame images of the video stream, and the one or more video frame images include sub-images depicting the one or more data screens. For example, the one or more video frame images capture at least a portion of a data screen of a hosting device 101, a portion of a screen projection on the wall and/or a portion of a data screen of an electronic whiteboard. In another example, the one or more video frame images capture the full data screen of the hosting device 101, the full projection screen on the wall and/or the full data screen of the electronic whiteboard.

A data view mode presents a data stream associated with the multi-user communication session to the participant 125. For example, the data view mode presents a data stream with the slides being presented during the multi-user communication session to the participant 125 in full screen on the mobile device 115. In another example, the data view mode presents the data stream on the mobile device 115 in full resolution.

In one embodiment, the view presentation module 204 receives, from the view switching module 208, an identifier (ID) of a detected data screen and a view switching signal indicating that a view on the mobile device 115 should be switched from the video view to the data view. In some embodiments, the view presentation module 204 receives a data stream associated with the detected data screen directly from the display device 107 associated with the data screen. In some other embodiments, the view presentation module 204 receives the data stream via the hosting device 101. Responsive to receiving the view switching signal, the view presentation module 204 stops presenting the video stream on the mobile device 115 and starts to present the data stream associated with the data screen on the mobile device 115. Persons of ordinary skill in the art will recognize that the sections describing presenting the video stream or data stream are meant to represent the view presentation module 204 instructing the user interface module 210 to generate graphical data that is sent to the mobile device 115 via the communication unit 239 for display.

In some examples, an embedded data stream is included in the data stream. The view presentation module 204 receives, from the view switching module 208, a view switching signal instructing the view presentation module 204 to switch the view on the mobile device 115 from the data view to an embedded data view. The embedded data view mode presents the embedded data stream to the participant 125 in full resolution or in full screen on the mobile device 115. Responsive to receiving the view switching signal, the view presentation module 204 stops presenting the data stream and starts to present the embedded data stream on the mobile device 115. An embedded data stream can be a videoconferencing meeting, a presentation, a video clip, a text document, presentation slides, or other types of data embedded in the data stream.

If the view presentation module 204 receives a view switching signal instructing the view presentation module 204 to switch the view from the embedded data view back to the data view from the view switching module 208, the view presentation module 204 stops presenting the embedded data stream and starts to present the data stream on the mobile device 115 again. In one embodiment, the view presentation module 204 receives a view switching signal instructing the view presentation module 204 to switch the view on the mobile device 115 from the data view to the video view from the view switching module 208. Responsive to the view switching signal, the view presentation module 204 stops presenting the data stream and starts to present the video stream on the mobile device 115.

The screen detection module 206 can be software including routines for performing data screen detection in a video frame image. In one embodiment, the screen detection module 206 can be a set of instructions executable by the processor 235 to provide the functionality described below for performing data screen detection in a video frame image. In another embodiment, the screen detection module 206 can be stored in the memory 237 of the computing device 200 and can be accessible and executable by the processor 235. In either embodiment, the screen detection module 206 can be adapted for cooperation and communication with the processor 235 and other components of the computing device 200 via signal line 234.

In one embodiment, the screen detection module 206 registers one or more display devices 107 with the registration server 130. For example, the screen detection module 206 can record a device identifier, a user associated with the display device 107, etc. with the display device 107 and store the registration information in the storage 243. Each display device 107 sends an updated image of its data screen to the registration server 130 periodically. For example, each display device 107 sends its up-to-date screenshot image to the registration server 130 periodically. In some examples, the display device 107 sends the updated screenshot images of its data screen to the registration server 130 via the hosting device 101.

In one embodiment, the screen detection module 206 detects an occurrence of a trigger event. For example, the event could be a detection trigger event that triggers a detection of one or more data screens in a video frame image. For example, a detection trigger event causes the screen detection module 206 to detect whether the video frame image includes a data screen. Example detection trigger events include, but are not limited to, motion of the camera 103 (e.g., panning, zooming or tilting of the camera 103, movement of the camera 103, etc.) and/or motion of an object in the video frame image (e.g., appearance of a projection on the wall in the video frame image, movement of a whiteboard, etc.). In another example, the trigger event could be based on a timer.

Responsive to the occurrence of the detection trigger event, the screen detection module 206 receives a latest video frame image of the video stream from the camera 103 directly or via the hosting device 101. In some examples, the screen detection module 206 receives the latest video frame image of the video stream from the mobile device 115 or a video server that provides the video stream. The screen detection module 206 performs data screen detection in the latest video frame image responsive to the occurrence of the detection trigger event. For example, the screen detection module 206 determines whether a data screen appears in the latest video frame image by matching a latest screenshot image of the data screen with the latest video frame image.

In some examples, for each data screen registered with the registration server 130, the screen detection module 206 determines whether a sub-image that matches the latest screenshot image of the data screen appears in the latest video frame image. For example, the screen detection module 206 determines whether the latest video frame image includes a sub-image that depicts the data screen (e.g., the screen detection module 206 determines whether the data screen is captured by the latest video frame image). In a further example, the screen detection module 206 runs an image matching algorithm to find the correspondence between the latest video frame image and the latest screenshot image of the data screen. If the screen detection module 206 finds a match between the latest video frame image and the latest screenshot image of the data screen, the screen detection module 206 highlights the matching area in the video frame image on the mobile device 115. For example, the screen detection module 206 highlights the detected data screen in the video frame image on the mobile device 115.

In one embodiment, the screen detection module 206 runs the image matching algorithm in real time. An example image matching algorithm includes a scale-invariant feature transform (SIFT) algorithm. The SIFT algorithm extracts feature points of both the latest video frame image and the latest screenshot image of the data screen, where the feature points from both images are matched based on the k-nearest neighbors (KNN), and the random sample consensus (RANSAC) algorithm is used to find the consensus and to determine the homographic matrix. Additional information about how to use SIFT, KNN and RANSAC for image matching can be found at Hess, R., *An Open-Source SIFT Library*, Proceedings of the International Conference on Multimedia, October 2010, pp. 1493-96. Persons of ordinary skill in the art will recognize that other image matching algorithms can be used.

If the screen detection module 206 detects one or more data screens existing in the video frame image, the screen detection module 206 generates a matching result including one or more matches between the one or more data screens and the video frame image. The screen detection module 206 notifies the mobile device 115 of the one or more matches, and establishes a direct connection between the mobile device 115 and each display device 107 that has one matched data screen. The screen detection module 206 highlights one or more matching areas in the video frame image, where each matching area corresponds to a position of one data screen captured in the video frame image. The screen detection module 206 displays the highlighted matching areas on the mobile device 115.

In another embodiment, the camera 103 is statically deployed and captures one or more data screens in the hosting environment 137, and positions of the one or more data screens remain unchanged in the video frame images. The screen detection module 206 can determine existence of the one or more data screens based on the static setting in the hosting environment 137, and can pre-calibrate positions of the one or more data screens in the video frame images. The screen detection module 206 highlights the one or more data screens in the video frame images at the pre-calibrated positions in the video frame images.

The screen detection module 206 sends one or more screen IDs identifying the one or more detected data screens and data describing one or more matching areas in the video frame image to the view switching module 208. In another embodiment, the screen detection module 206 sends pre-calibrated positions of one or more data screens to the view switching module 208. In yet another embodiment, the screen detection module 206 stores the one or more screen IDs, data describing the one or more matching areas and/or the pre-calibrated positions in the storage 243.

The view switching module 208 can be software including routines for switching a view on a mobile device 115 between a video view and a data view. In one embodiment, the view switching module 208 can be a set of instructions executable by the processor 235 to provide the functionality described below for switching a view on a mobile device 115 between a video view and a data view. In another embodiment, the view switching module 208 can be stored in the memory 237 of the computing device 200 and can be accessible and executable by the processor 235. In either embodiment, the view switching module 208 can be adapted for cooperation and communication with the processor 235 and other components of the computing device 200 via signal line 236.

In one embodiment, the view switching module 208 receives, from the screen detection module 206, data describing one or more screen IDs identifying one or more detected data screens and one or more matching areas associated with the one or more detected data screens in the video frame image. In the video view mode, the mobile device 115 presents the video stream to the participant 125, with the one or more detected data screens highlighted in the matching areas of the video frame images. If the participant 125 performs a natural gesture (e.g., a pinch open or double tap gesture, etc.) within a highlighted matching area of a data screen on a touch screen of the mobile device 115, the view switching module 208 interprets the participant's natural gesture as a command to switch from the video view to the data view. The view switching module 208 generates a view switching signal describing the command and sends the view switching signal to the view presentation module 204, causing the view presentation module 204 to present the data view to the participant 125. In one embodiment, the view switching module 208 interprets the natural gesture as a command to switch from the video view to the data view if the portion of the data screen detected in the video frame image is greater than a predetermined threshold (e.g., a majority portion of the data screen appearing in the video frame image).

For example, the participant 125 can use a natural gesture to zoom into a data screen detected in the video frame image, so that the video view presenting the video frame image scales up accordingly on the touch screen of the mobile device 115. If the size of the scaled-up data screen in the video frame image reaches a predetermined threshold, the view switching module 208 automatically switches the view on the mobile device 115 from the video view to the data view, causing the view presentation module 204 to present the data stream associated with the detected data screen on the mobile device 115. The mobile device 115 switches from the video view mode to the data view mode accordingly. The participant 125 can further perform natural gestures to operate on the data stream such as zooming into the data stream, copying the data stream, dragging the data stream, etc.

In the data view mode, the mobile device 115 presents the data stream to the participant 125. If the participant 125 performs a natural gesture (e.g., a pinch close gesture or tapping on an exit icon, etc.) on the data stream displayed on a touch screen of the mobile device 115, the view switching module 208 interprets the participant's natural gesture as a command to switch from the data view back to the video view. The view switching module 208 generates a view switching signal describing the command and sends the view switching signal to the view presentation module 204, causing the view presentation module 204 to present the video view to the participant 125. Again, the screen detection module 206 detects the one or more data screens visible to the camera 103 in the video frame images, and highlights the one or more data screens in the video frame images. For example, the participant 125 can use a natural gesture to zoom out the data stream, so that the data view presenting the data stream scales down accordingly on the touch screen of the mobile device 115. If the size of the scaled down data stream reaches a predetermined threshold, the view switching module 208 automatically switches the view on the mobile device 115 from the data view to the video view, causing the view presentation module 204 to present the video stream on the mobile device 115.

In the data view mode, if the presented data stream includes an embedded data stream, the participant 125 can use a natural gesture on the embedded data stream. The view switching module 208 interprets the natural gesture as a command to switch from the data view to the embedded data view. The view switching module 208 generates a view switching signal describing the command and sends the view switching signal to the view presentation module 204, causing the view presentation module 204 to present the embedded data stream to the participant 125 in full resolution. The participant 125 may perform another natural gesture to exit from the embedded data view and return to the data view. For example, if the data stream includes an embedded video, the participant 125 can issue a tap open command on an icon representing the embedded video during the data view mode, causing the view presentation module 204 to present the embedded video in full screen on the mobile device 115. After viewing the embedded video, the participant 125 can issue a pinch close command to exit from the embedded data view and return to the data view.

The user interface module 210 can be software including routines for generating graphical data for providing a user interface. In one embodiment, the user interface module 210 can be a set of instructions executable by the processor 235 to provide the functionality described below for generating graphical data for providing a user interface. In another embodiment, the user interface module 210 can be stored in the memory 237 of the computing device 200 and can be accessible and executable by the processor 235. In either embodiment, the user interface module 210 can be adapted for cooperation and communication with the processor 235 and other components of the computing device 200 via signal line 238.

In one embodiment, the user interface module 210 receives instructions from the view presentation module 204 to generate graphical data for providing a user interface to a user such as a host 135 or a participant 125. The user interface module 210 sends the graphical data to the hosting device 101 or the mobile device 115, causing the hosting device 101 or the mobile device 115 to present the user interface to the user. For example, the user interface module 210 generates graphical data for providing a user interface that depicts a video stream or a data stream. The user interface module 210 sends the graphical data to the mobile device 115, causing the mobile device 115 to present the video stream or the data stream to the participant 125 via the user interface. In other embodiments, the user interface module 210 may generate graphical data for providing other user interfaces to users.

The optional camera adjustment module 212 can be software including routines for adjusting a camera 103. In one embodiment, the camera adjustment module 212 can be a set of instructions executable by the processor 235 to provide the functionality described below for adjusting a camera 103. In another embodiment, the camera adjustment module 212 can be stored in the memory 237 of the computing device 200 and can be accessible and executable by the processor 235. In either embodiment, the camera adjustment module 212 can be adapted for cooperation and communication with the processor 235 and other components of the computing device 200 via signal line 240.

In one embodiment, a participant 125 can use natural gestures to navigate the camera 103. For example, the participant 125 can perform a natural gesture to change the view angle of the camera 103 via a user interface shown on the mobile device 115. The camera adjustment module 212 receives data describing the participant's natural gesture and interprets the participant's natural gesture as a command to adjust the camera 103 such as panning, tilting, zooming in or zooming out the camera 103. The camera adjustment module 212 adjusts the camera 103 according to the participant's natural gesture. Through adjusting the camera 103, the participant 125 may keep one or more data screens of one or more display devices 107 within the field of view of the camera 103, so that the camera 103 captures the one or more data screens in the video frame images.

An example use of the system described herein includes a videoconferencing scenario, where a first party (e.g., a host 135) is in a conference room equipped with a camera 103 and one or more data screens, and a second party (e.g., a participant 125) is a remote mobile user participating the videoconference using a mobile device 115 such as a smart phone or a tablet. After the participant 125 joins the videoconference, the participation application 123 receives a video stream from the camera 103 and presents the video stream to the participant 125 on a touch screen of the mobile device 115. The participation application 123 detects one or more data screens captured by video frame images. The participant 125 can issue a natural gesture such as a pinch open gesture on a detected data screen highlighted in the video frame images, causing the mobile device 115 to switch from video view to data view. Afterwards, the participation application 123 presents a data stream associated with the detected data screen to the participant 125 in full resolution. The participant 125 may issue another natural gesture such as a pinch close gesture to switch from the data view back to the video view.

Another example use of the system described herein includes a retrieval application for retrieving information relevant to an image. For example, a user can capture an image of an advertisement (e.g., an advertisement for a vehicle brand), and instruct the retrieval application to retrieve information relevant to the advertisement. The image of the advertisement may include a banner and/or a data screen image showing a commercial video. The retrieval application can instruct the screen detection module 206 to detect the data screen in the image of the advertisement and to identify a product that matches content shown in the data screen image. The retrieval application may retrieve information relevant to the identified product from one or more databases and provide the relevant information to a user. Other example uses of the system described herein are possible.

Graphic Representations

Figure 3A:
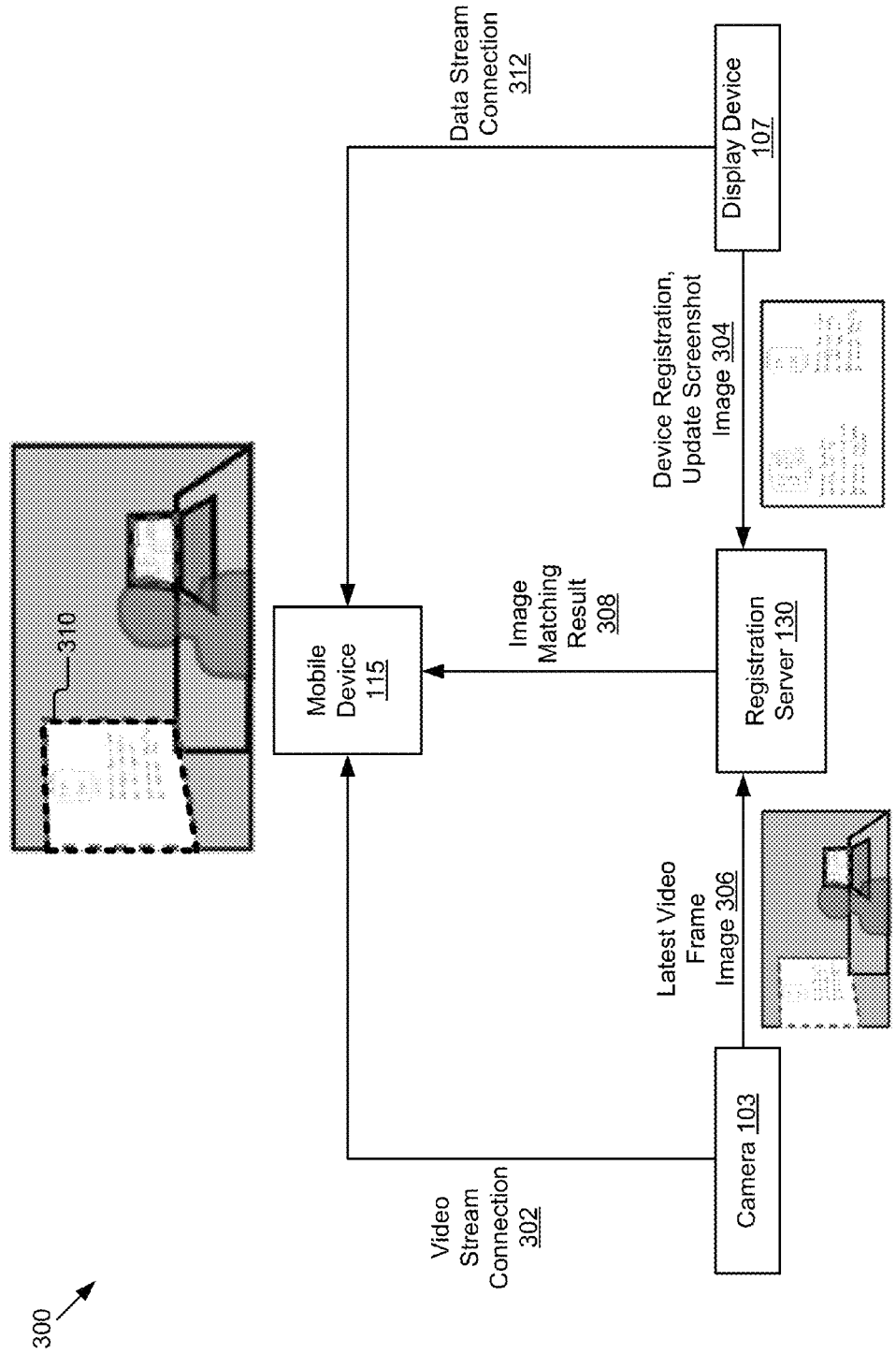
FIG. 3A is a graphic representation illustrating one embodiment of a process for performing data screen detection.

FIG. 3A is a graphic representation 300 illustrating one embodiment of a process for performing data screen detection. After a participant 125 joins a multi-user communication session using the mobile device 115, the camera 103 establishes a video stream connection 302 with the mobile device 115. The camera 103 sends a video stream to the mobile device 115 via the video stream connection 302, causing the mobile device 115 to present the video stream to the participant 125 in a video view mode. The display device 107 registers with the registration server 130 and sends updated screenshot images 304 of a data screen associated with the display device 107 to the registration server 130 periodically. In the illustrated example, the display device 107 is an electronic whiteboard. In one embodiment, the registration server 130 detects a detection trigger event. For example, the registration server 130 detects motion of the camera 103 such as panning or tilting. The registration server 130 receives a latest video frame image 306 from the camera 103 responsive to the detection trigger event. In some examples, the registration server 130 receives the latest video frame image 306 from the mobile device 115.

The registration server 130 uses an image-matching method to detect active data screens dynamically. For example, the registration server 130 uses an image matching algorithm to find the correspondence between the latest video frame image 306 and the latest screenshot image received from either the hosting device 101 or the display device 107. If a matching result 308 between the latest video frame image 306 and the latest screenshot image of the data screen is found, the registration server 130 notifies the mobile device 115 of the matching result 308 and highlights the corresponding data screen in the video frame images. For example, the registration server 130 uses a box 310 to highlight a data screen of an electronic whiteboard in the video frame image. The display device 107 associated with the data screen establishes a data stream connection 312 with the mobile device 115. The display device 107 may send a data stream to the mobile device 115 via the data stream connection 312.

Figure 3B:
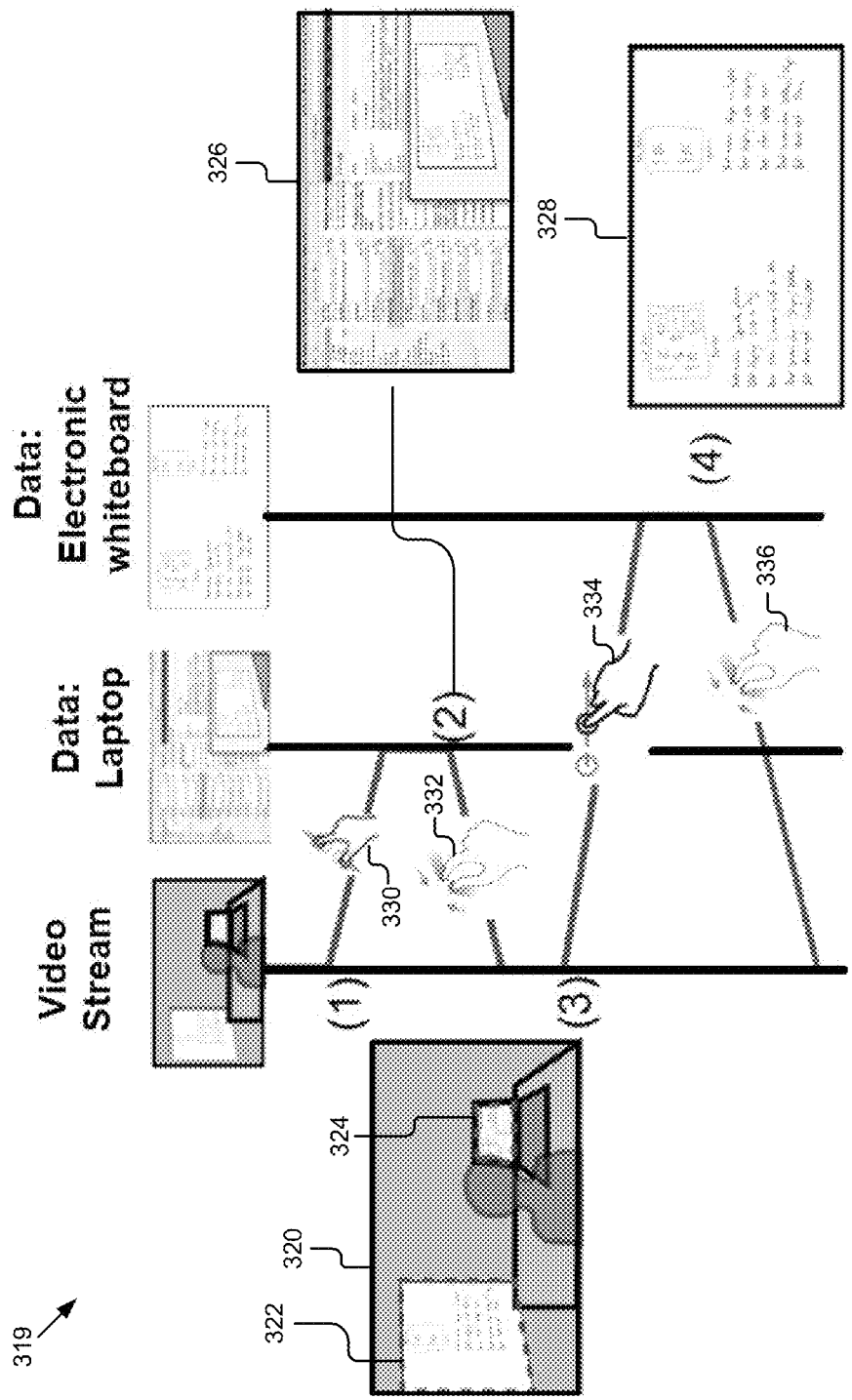
FIG. 3B is a graphic representation illustrating one embodiment for switching between video views and data views on a mobile device using natural gestures.

FIG. 3B is a graphic representation 319 illustrating one embodiment for switching between video views and data views on a mobile device 115 using natural gestures. The participation application 123 interprets natural gestures from a participant 125 to achieve the seamless user experience. In this embodiment, the participation application 123 captures and transmits a first data stream and a second data stream along with the video stream captured from the camera 103 to the mobile device 115. The first data stream includes the high quality screenshot images from the hosting device 101 (e.g., a laptop), and the second data stream includes the strokes from the display device 107 (e.g., an electronic whiteboard). Both data screens (the data screen of the laptop and the data screen of the electronic whiteboard) are visible to the camera 103. In one embodiment, the screenshot images from the hosting device 101 include an embedded image depicting the data screen of the display device 107.

At the beginning, the video view is shown on the mobile device 115 to present the video frame image 320 to the participant 125. For example, the video frame image 320 is shown in full resolution or on full screen of the mobile device 115. As shown in FIG. 3B, both data screens (the data screen 324 of the laptop and the data screen 322 of the electronic whiteboard) are visible in the video frame image 320 displayed on the participant's mobile device 115. The participation application 123 intelligently detects and notifies the participant 125 of the existence of data screens in the video frame images. For example, the participation application 123 highlights the data screens 322 and 324 in the video frame image 320.

At phase (1), if the participant 125 tries to get more detail from the laptop data screen 324, he or she can perform a natural gesture 330 on the laptop data screen 324 shown in the video frame image 320 to zoom into the laptop data screen 324. An example natural gesture 330 can be a pinch or double tap gesture. Responsive to the natural gesture 330, the video view on the mobile device 115 scales up. If the size of the recognized laptop data screen 324 reaches a pre-set threshold, the mobile device 115 automatically switches from the video view to the data view. For example, the view on the mobile device 115 switches from presenting the video frame image 320 in full resolution to presenting a high quality screenshot image 326 of the laptop data screen 324 in full resolution. The participation application 123 interprets any further pinch or dragging gestures performed on the screenshot image 326 as operating on the screenshot image 326 of the laptop data screen 324.

At phase (2), when the participant 125 performs a natural gesture 332 such as a pinch gesture on the screenshot image 326 to zoom out of the data view and the zoom-out scale ratio reaches a pre-set threshold, the mobile device 115 switches back to the video view from the data view. Again, the participation application 123 presents the video frame image 320 on the mobile device 115 in full resolution, and detects and marks the visible data screens 322 and 324 in the video frame image 320.

At phase (3), the participant 125 performs a natural gesture 334 such as a dragging gesture on the highlighted data screen 322 in the video frame image 320, causing the mobile device 115 to enlarge the video view greater than a threshold amount, which causes the mobile device 115 to switch from showing the video frame image 320 in full resolution to the data view showing a screenshot image 328 of the electronic whiteboard in full resolution. At phase (4), the participant 125 performs a natural gesture 336 such as a pinch gesture on the screenshot image 328 to zoom out the data view, causing the mobile device 115 to decrease the data view until a threshold point triggers the mobile device 115 to switch back to the video view from the data view. Again, the mobile device 115 presents the video frame image 320 to the participant 125.

Figure 4A:
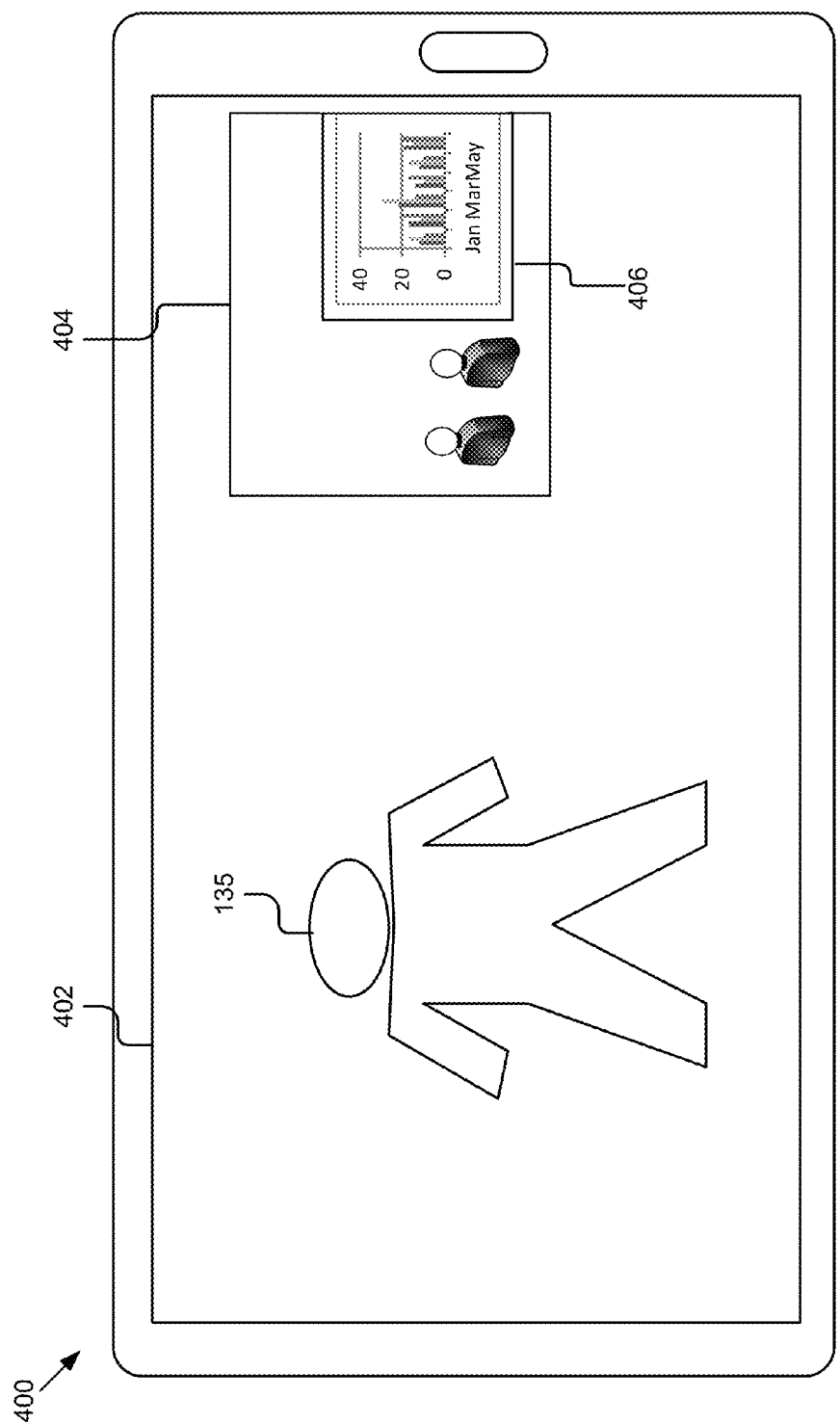
FIG. 4A is a graphic representation of one embodiment of a graphic user interface illustrating a video view mode on a mobile device.

FIG. 4A is a graphic representation 400 of one embodiment of a graphic user interface illustrating a video view on a mobile device 115. The example user interface shows a video frame image 402 depicting a conference room. The video frame image 402 depicts a host 135 and a data screen 404 of the hosting device 101 projected on a wall of the conference room. The data screen 404 includes an embedded data screen 406. If the participant 125 performs a natural gesture on the data screen 404 captured in the video frame image 402, the mobile device 115 switches from the video view to the data view shown in FIG. 4B.

Figure 4B:
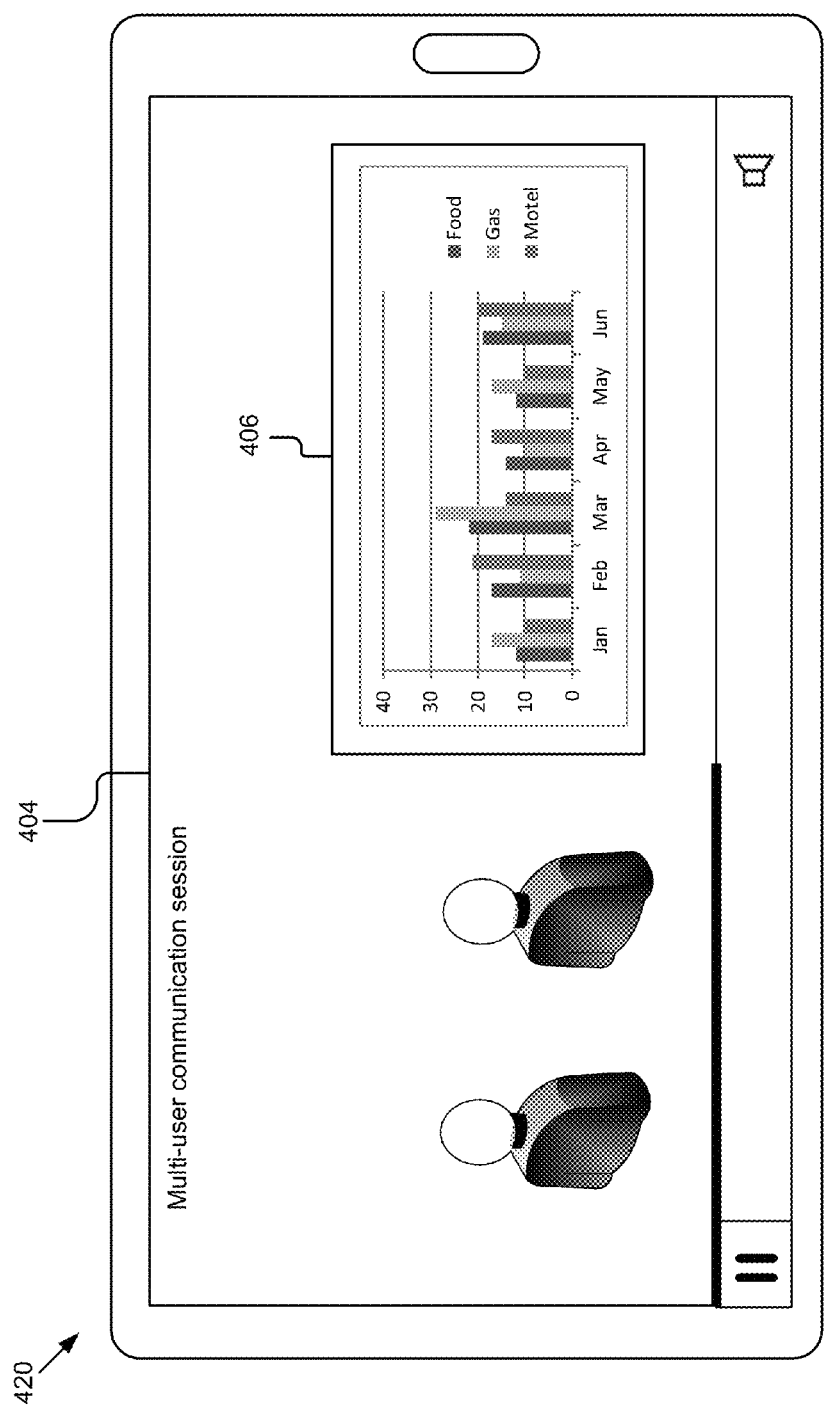
FIG. 4B is a graphic representation of one embodiment of a graphic user interface illustrating a data view mode on a mobile device.

FIG. 4B is a graphic representation 420 of one embodiment of a graphic user interface illustrating a data view on a mobile device 115. In this example, a data stream including screenshot images of the data screen 404 is presented on the mobile device 115. The data stream is a multi-user communication session including an embedded data stream. For example, the data stream is a video clip of another conference with embedded slides. The embedded data screen 406 presenting the embedded slides is shown in the screenshot image of the data screen 404.

When the participant 125 switches to the data view shown in FIG. 4B from the video view shown in FIG. 4A, the data stream including the video clip starts to play. In one embodiment, the participant 125 may exit from the data view shown in FIG. 4B and return to the video view shown in FIG. 4A by performing a natural gesture (e.g., a pinch to close gesture) on the screenshot image of the data screen 404. In one embodiment, the participant 125 can keep zooming into the data view if the video clip includes embedded presentation slides or whiteboard strokes information. For example, if the participant 125 performs a natural gesture on the embedded data screen 406, the mobile device 115 can switch from the data view to an embedded data view shown in FIG. 4C to present slides embedded in the video clip.

Figure 4C:
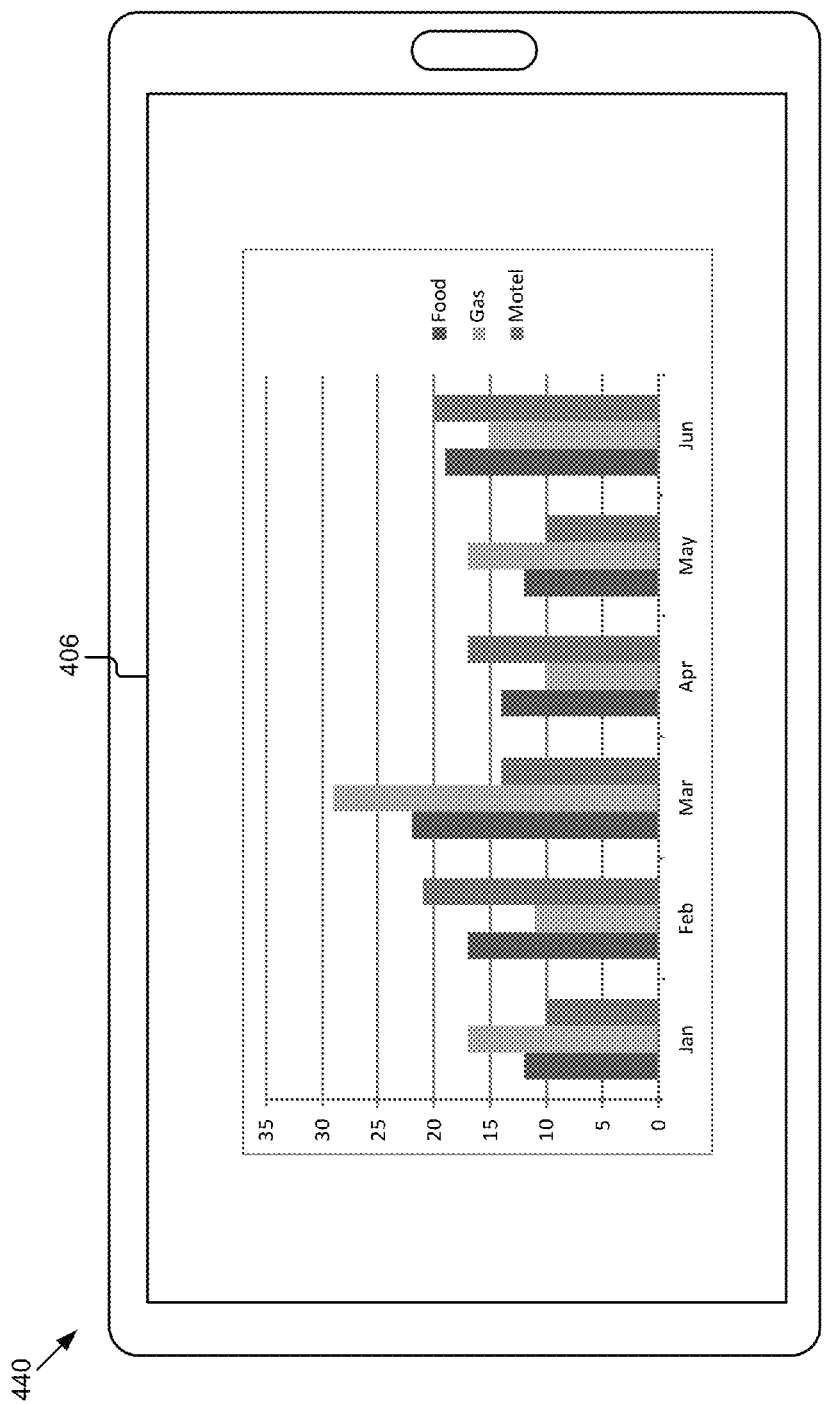
FIG. 4C is a graphic representation of one embodiment of a graphic user interface illustrating an embedded data view mode on a mobile device.

FIG. 4C is a graphic representation 440 of one embodiment of a graphic user interface illustrating an embedded data view on a mobile device 115. In this example, the slides shown in the embedded data screen 406 is presented to the participant 125. The participant 125 may exit from the embedded data view and return to the data view shown in FIG. 4B by performing a natural gesture (e.g., a pinch to close gesture) on the screenshot image of the embedded data screen 406.

Methods

Figure 5:
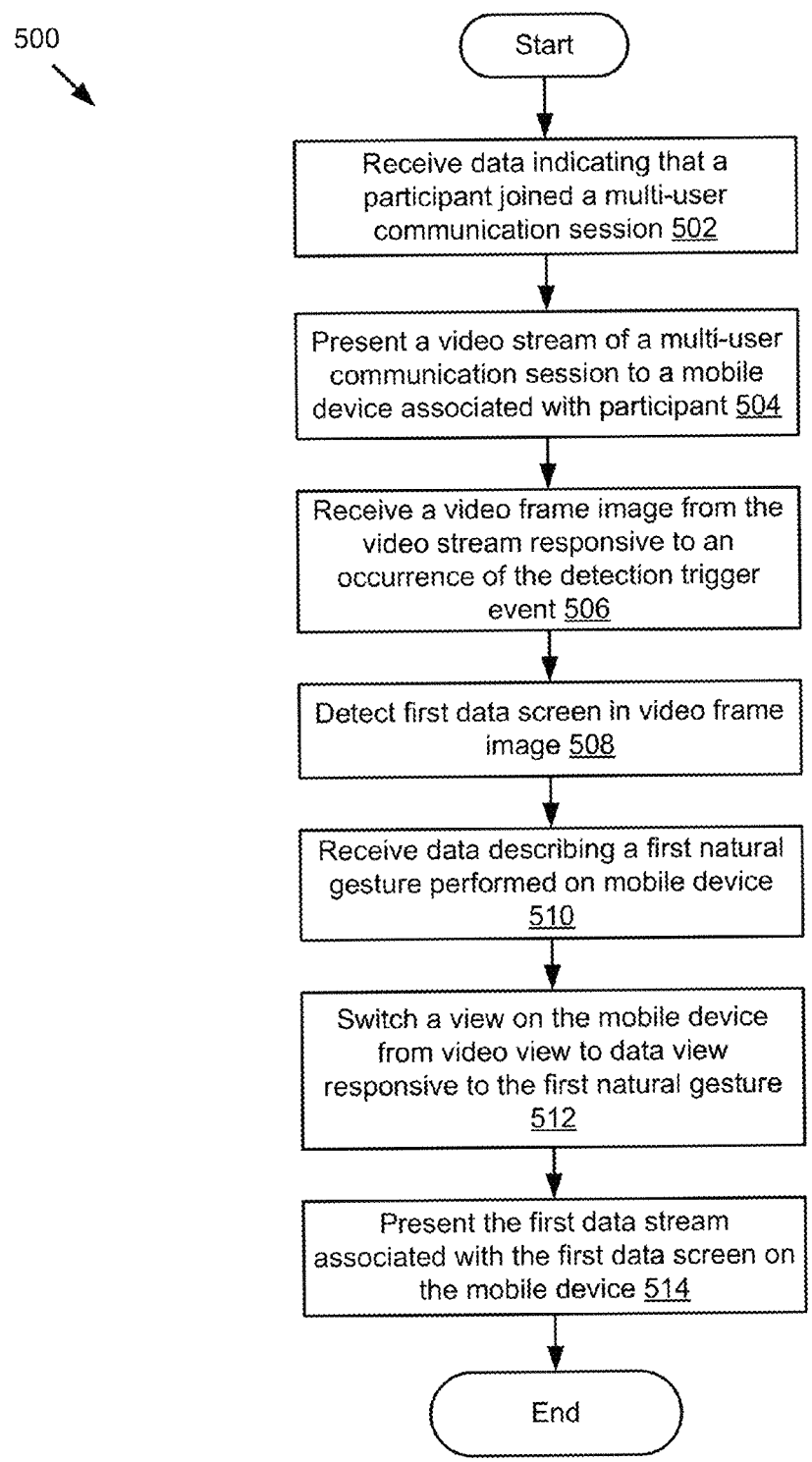
FIG. 5 is a flow diagram illustrating one embodiment of a method for switching between video views and data views using natural gestures in a multi-user communication session.

FIG. 5 is a flow diagram illustrating one embodiment of a method 500 for switching between video views and data views using natural gestures in a multi-user communication session. In one embodiment, the controller 202 receives 502 data indicating that a participant 125 joined a multi-user communication session from a mobile device 115 associated with the participant 125. The view presentation module 204 presents 504 a video stream of the multi-user communication session to the mobile device 115. For example, the view presentation module 204 instructs the user interface engine 210 to generate graphical data for displaying the video stream. In one embodiment, the screen detection module 206 determines an occurrence of a detection trigger event. The controller 202 receives 506 a video frame image from the video stream responsive to the occurrence of the detection trigger event. For example, the controller 202 receives a latest video frame image of the video stream from the camera 103. The screen detection module 206 detects 508 a first data screen in the video frame image. For example, the screen detection module 206 determines that the video frame image captures the first data screen.

The controller 202 receives 510 data describing a first natural gesture performed on the mobile device 115. For example, the controller 202 receives data describing a pinch to open gesture performed on the first data screen in the video frame image. The view switching module 208 switches 512 a view on the mobile device 115 from video view to data view responsive to the first natural gesture. The view presentation module 204 presents 514 a first data stream associated with the first data screen on the mobile device 115. In one embodiment, the first data stream includes one or more high-definition screenshot images of the first data screen generated by a display device 107 associated with the first data screen.

Figure 6A:
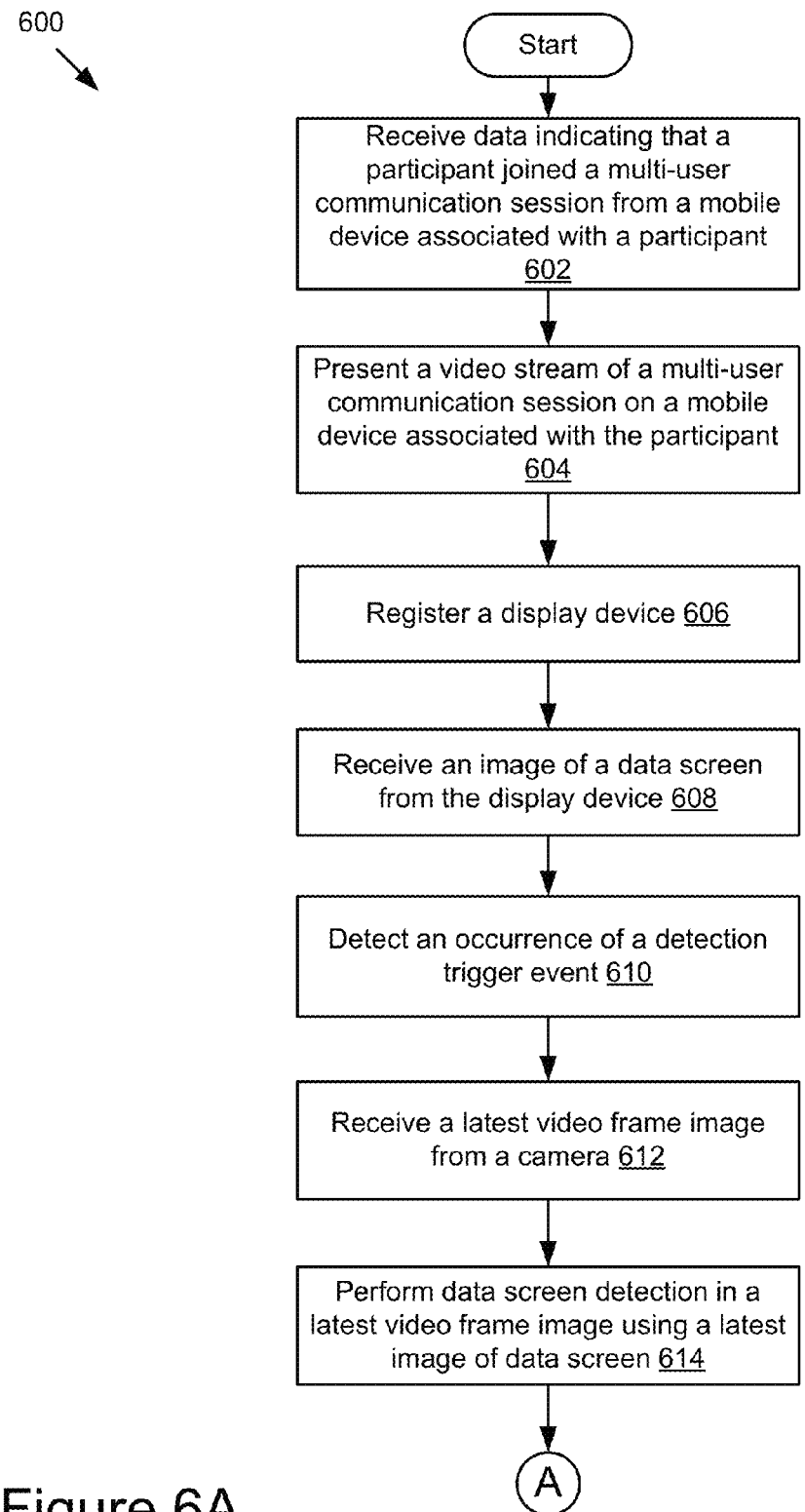
FIGS. 6A-6C are flow diagrams illustrating another embodiment of a method for switching between video views and data views using natural gestures in a multi-user communication session.
Figure 6B:
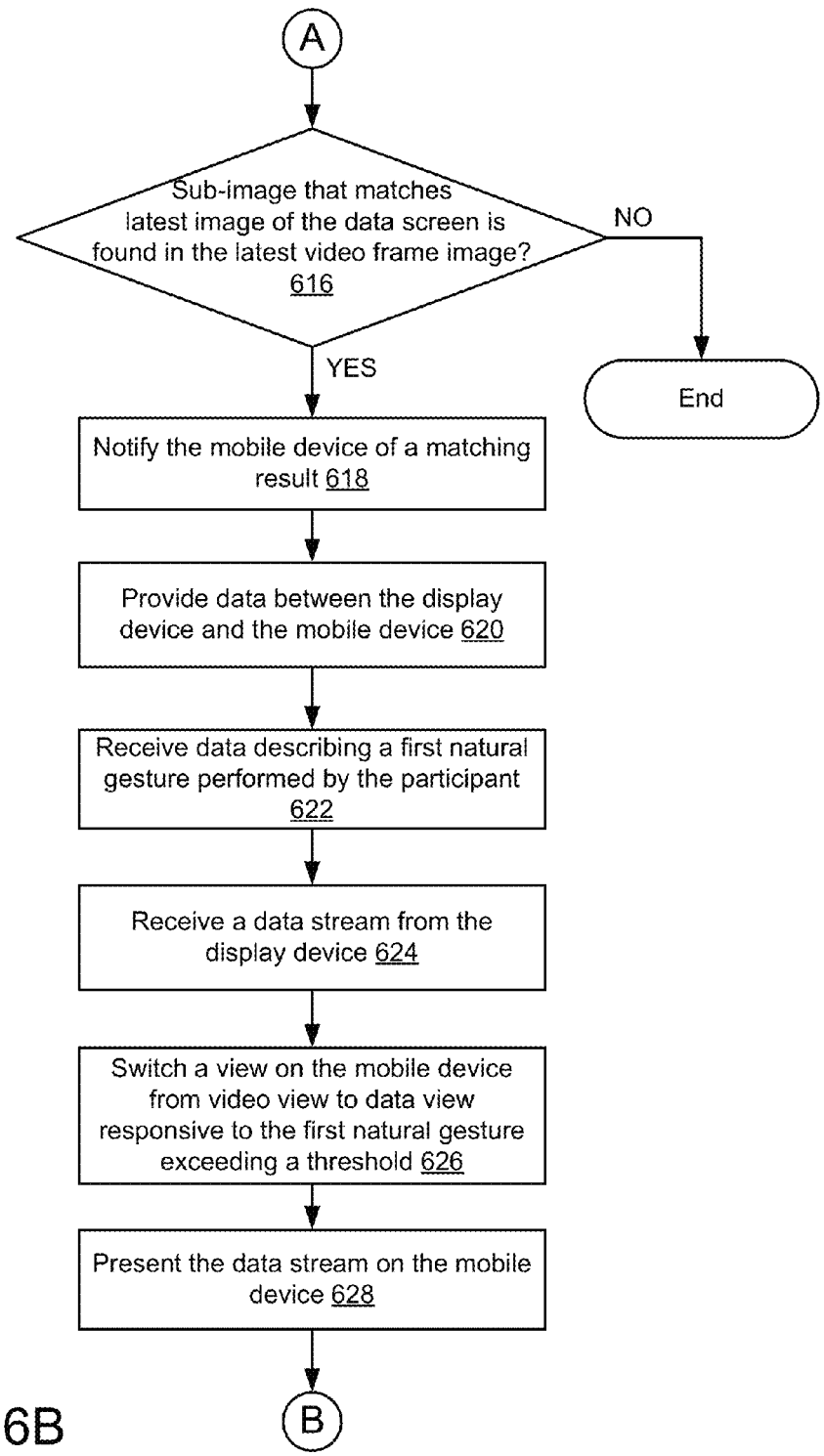
Figure 6C:
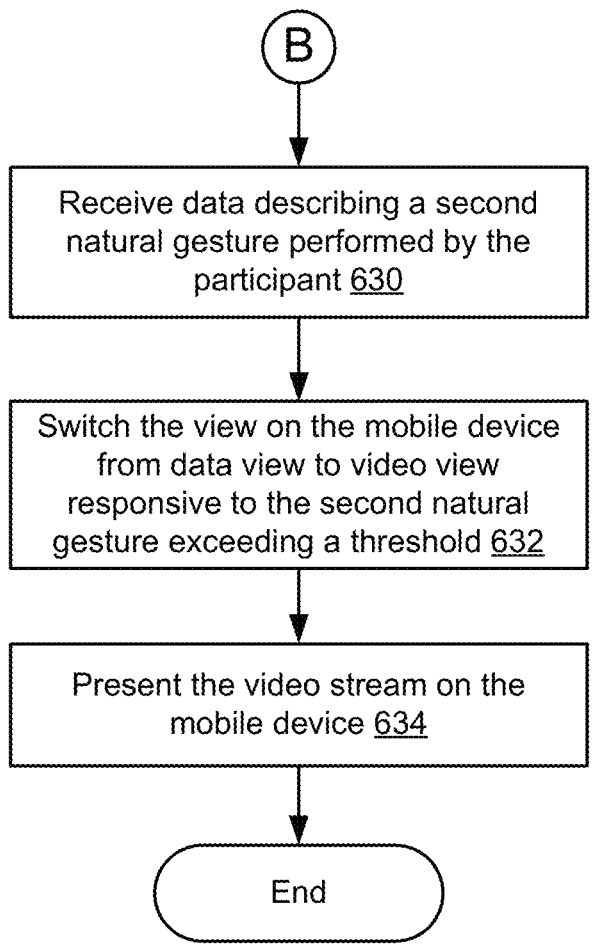

FIGS. 6A-6C are flow diagrams illustrating another embodiment of a method 600 for switching between video views and data views using natural gestures in a multi-user communication session. Referring to FIG. 6A, the controller 202 receives 602 data indicating that a participant 125 joined a multi-user communication session from a mobile device 115 associated with the participant 125. The view presentation module 204 presents 604 a video stream of the multi-user communication session on the mobile device 115. The screen detection module 206 registers 606 a display device 107 with the registration server 130. The display device 107 includes a data screen for presenting a data stream of the multi-user communication session in the hosting environment 137. The controller 202 receives 608 images of the data screen from the display device 107 periodically. For example, the controller 202 receives screenshot images of the data screen from the display device 107 periodically.

The screen detection module 206 detects 610 an occurrence of a detection trigger event. The controller 202 receives 612 a latest video frame image from the camera 103 responsive to the occurrence of the detection trigger event. The screen detection module 206 performs 614 data screen detection in the latest video frame image using the latest image of the data screen received from the display device 107.

Referring to FIG. 6B, the screen detection module 206 determines 616 whether a sub-image that matches the latest image of the data screen is found in the latest video frame image. If the sub-image is found in the latest video frame image, the method 600 moves to step 618. Otherwise, the method 600 ends. Turning to step 618, the screen detection module 206 generates a matching result indicating the match between the latest image of the data screen and the latest video frame image, and notifies the mobile device 115 of the matching result. The screen detection module 206 provides data between the mobile device 115 and the display device 107 associated with the data screen. For example, the screen detection module 206 establishes a direct connection between the devices. In one embodiment, the display device 107 can transmit a data stream associated with the data screen to the mobile device 115 via the direct connection.

The controller 202 receives 622 data describing a first natural gesture performed by the participant 125 on the sub-image depicting the data screen in the video frame image. The controller 202 receives 624 a data stream associated with the data screen from the display device 107. The view switching module 208 switches 626 a view on the mobile device 115 from video view to data view responsive to the first natural gesture exceeding a threshold. For example, the user makes an expanding view starting in the center of the screen and moving over half the width of the screen. The view presentation module 204 presents 628 the data stream associated with the data screen on the mobile device 115.

Referring to FIG. 6C, the controller 202 receives 630 data describing a second natural gesture performed by the participant 125 on the data stream. The view switching module 208 switches 632 the view on the mobile device 115 from data view back to video view responsive to the second natural gesture exceeding a threshold. The view presentation module 204 presents 634 the video stream on the mobile device 115.

Figure 7:
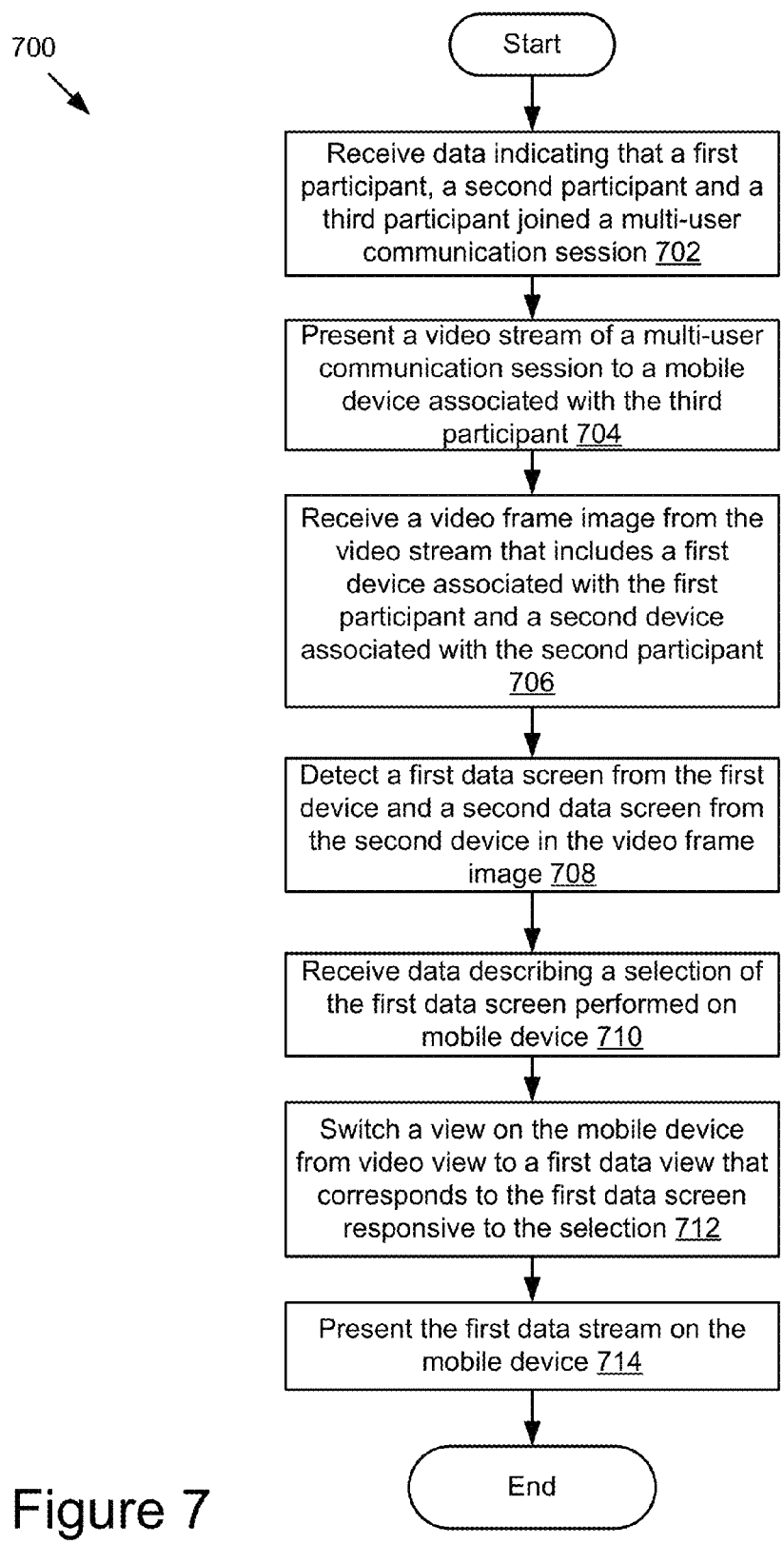
FIG. 7 is a flow diagram illustrating one embodiment of a method for switching between a video view and one of two different data views using a selection in a multi-user communication session.

FIG. 7 is a flow diagram illustrating one embodiment of a method 700 for switching between a video view and one of two different data views using a selection in a multi-user communication session. In one embodiment, the controller 202 receives 702 data indicating that a first participant, a second participant and a third participant 125 joined a multi-user communication session. The view presentation module 204 presents 704 a video stream of the multi-user communication session to a mobile device 115 associated with the third participant 125. For example, the view presentation module 204 instructs the user interface engine 210 to generate graphical data for displaying the video stream. In one embodiment, the screen detection module 206 determines an occurrence of a detection trigger event. The controller 202 receives 706 a video frame image from the video stream that includes a first device associated with the first participant and a second device associated with the second participant. For example, the controller 202 receives a latest video frame image of the video stream from the camera 103. The screen detection module 206 detects 708 a first data screen from the first device and a second data screen from the second device in the video frame image.

The controller 202 receives 710 data describing a selection of the first data screen performed on the mobile device 115. For example, the controller 202 receives data describing a finger pressing in the center of the image of the first device to indicate that the third participant wants to view the first data view. The view switching module 208 switches 712 a view on the mobile device 115 from video view to a first data view that corresponds to the first data screen responsive to the selection. The view presentation module 204 presents 714 the first data stream on the mobile device 115.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiments in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, with one or more processors, data indicating a participant joined a multi-user communication session;
presenting, with the one or more processors, a video stream of the multi-user communication session on a mobile device associated with the participant;
receiving, with the one or more processors, a video frame image from the video stream responsive to an occurrence of a detection trigger event;
receiving, with the one or more processors, a first image of a first data screen from a first display device;
detecting, with the one or more processors, a second image within the video frame image that matches the first image of the first data screen, the second image being another image of the first data screen captured in the video frame image;
receiving, with the one or more processors, data describing a first natural gesture performed on the mobile device;
switching, with the one or more processors, a view on the mobile device from video view to data view responsive to the first natural gesture exceeding a threshold; and
presenting, with the one or more processors, a first data stream associated with the first data screen on the mobile device.

2. The method of claim 1, further comprising:
notifying the mobile device of a match between the first image of the first data screen and the second image within the video frame image; and
providing data between the mobile device and the first display device.

3. The method of claim 1, wherein the detection trigger event includes one of motion of a camera and motion of an object captured in the video frame image.

4. The method of claim 1, further comprising:
receiving data describing a second natural gesture performed on the mobile device;
switching the view on the mobile device from data view to video view responsive to the second natural gesture exceeding a threshold; and
presenting the video stream on the mobile device.

5. The method of claim 4, further comprising:
detecting a second data screen in the video frame image;
receiving data describing a third natural gesture performed on the mobile device;
switching the view on the mobile device from video view to data view responsive to the third natural gesture exceeding a threshold; and
presenting a second data stream associated with the second data screen on the mobile device.

6. The method of claim 1, wherein the first data stream includes content presented on the first data screen.

7. The method of claim 1, wherein the first data stream includes an embedded data stream, and the method further comprising:
receiving data describing a fourth natural gesture performed on the mobile device; and
presenting the embedded data stream on the mobile device responsive to the fourth natural gesture.

8. A system comprising:
one or more processors;
a controller stored on a memory and executable by the one or more processors, the controller configured to receive data indicating a participant joined a multi-user communication session the controller configured to receive data describing a first natural gesture performed on a mobile device associated with the participant;
a view presentation module stored on the memory and executable by the one or more processors, the view presentation module configured to present a video stream of the multi-user communication session on the mobile device responsive to the participant joining the multi-user communication session, the view presentation module configured to present a first data stream associated with a first data screen on the mobile device responsive to the first natural gesture;
a screen detection module stored on the memory and executable by the one or more processors, the screen detection module configured to determine an occurrence of a detection trigger event, the screen detection module configured to receive a first image of the first data screen from the first display device and detect a second image within the video frame image that matches the first image of the first data screen, the second image being another image of the first data screen captured in the video frame image; and
a view switching module stored on the memory and executable by the one or more processors, the view switching module configured to switch a view on the mobile device from video view to data view responsive to the first natural gesture exceeding a threshold.

9. The system of claim 8, wherein the screen detection module is configured to:
- notify the mobile device of a match between the first image of the first data screen and the second image within the video frame image; and
- provide data between the mobile device and the first display device.

10. The system of claim 8, wherein the detection trigger event includes one of motion of a camera and motion of an object captured in the video frame image.

11. The system of claim 8, wherein:
- the controller is further configured to receive data describing a second natural gesture performed on the mobile device;
- the view switching module is further configured to switch the view on the mobile device from data view to video view responsive to the second natural gesture exceeding a threshold; and
- the view presentation module is further configured to present the video stream on the mobile device.

12. The system of claim 8, wherein:
- the screen detection module is further configured to detect a second data screen in the video frame image;
- the controller is further configured to receive data describing a third natural gesture performed on the mobile device;
- the view switching module is further configured to switch the view on the mobile device from video view to data view responsive to the third natural gesture exceeding a threshold; and
- the view presentation module is further configured to present a second data stream associated with the second data screen on the mobile device.

13. The system of claim 8, wherein the first data stream includes content presented on the first data screen.

14. The system of claim 8, wherein:
- the first data stream includes an embedded data stream;
- the controller is further configured to receive data describing a fourth natural gesture performed on the mobile device; and
- the view presentation module is further configured to present the embedded data stream on the mobile device responsive to the fourth natural gesture.

15. A computer-implemented method comprising:
- receiving, with one or more processors, data indicating that a first participant, a second participant and a third participant joined a multi-user communication session;
- presenting, with the one or more processors, a video stream of a multi-user communication session to a mobile device associated with the third participant;
- receiving, with the one or more processors, a video frame image from the first video stream that includes a first device associated with the first participant and a second device associated with the second participant;
- receiving, with the one or more processors, a first image of a first data screen from the first device and a second image of a second data screen from the second device;
- detecting a third image within the video frame image that matches the first image of the first data screen, the third image being another image of the first data screen captured in the video frame image;
- detecting a fourth image within the video frame image that matches the second image of the second data screen, the fourth image being another image of the second data screen captured in the video frame image;
- receiving, with the one or more processors, data describing a selection of the first data screen from at least two options including the first data screen and the second data screen, the selection performed on the mobile device;
- switching, with the one or more processors, a view on the mobile device from video view to a first data view that corresponds to the first data screen responsive to the selection of the first data screen; and
- presenting, with the one or more processors, a first data stream associated with the first data screen on the mobile device.

16. The method of claim 15, further comprising:
- notifying the mobile device of a match between the first image of the first data screen and the third image within the video frame image; and
- providing data between the mobile device and the first device.

17. The method of claim 15, wherein presenting the video stream is responsive to a detection trigger event that includes one of motion of a camera and motion of an object captured in the video frame image.

18. The method of claim 15, further comprising:
- receiving data describing a natural gesture performed on the mobile device;
- switching the view on the mobile device from data view to video view responsive to the natural gesture exceeding a threshold; and
- presenting the video stream on the mobile device.

19. The method of claim 18, further comprising:
- receiving data describing a selection of the second data screen performed on the mobile device;
- switching the view on the mobile device from video view to a second data view that corresponds to the second data screen responsive to the selection of the second data screen; and
- presenting a second data stream associated with the second data screen on the mobile device.

20. The method of claim 15, wherein the first data stream includes content presented on the first data screen.

* * * * *